No. 746,236. PATENTED DEC. 8, 1903.
R. BAGGALEY.
APPARATUS FOR PRECIPITATING INJURIOUS FUMES FROM SMELTER GASES.
APPLICATION FILED FEB. 7, 1903.
NO MODEL. 3 SHEETS—SHEET 1.
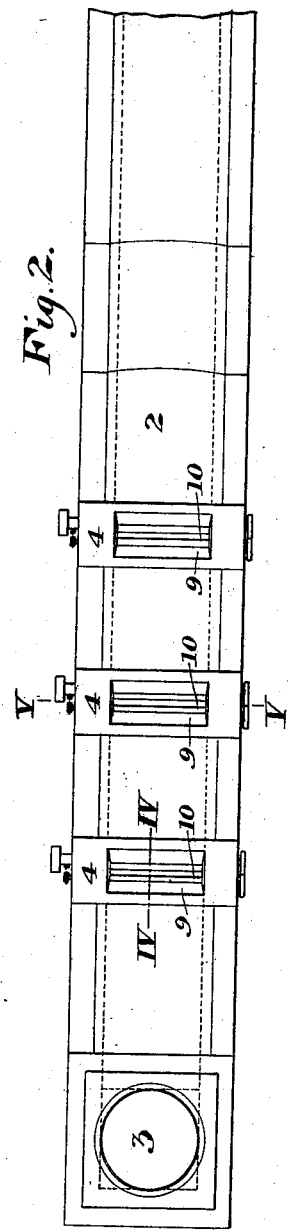
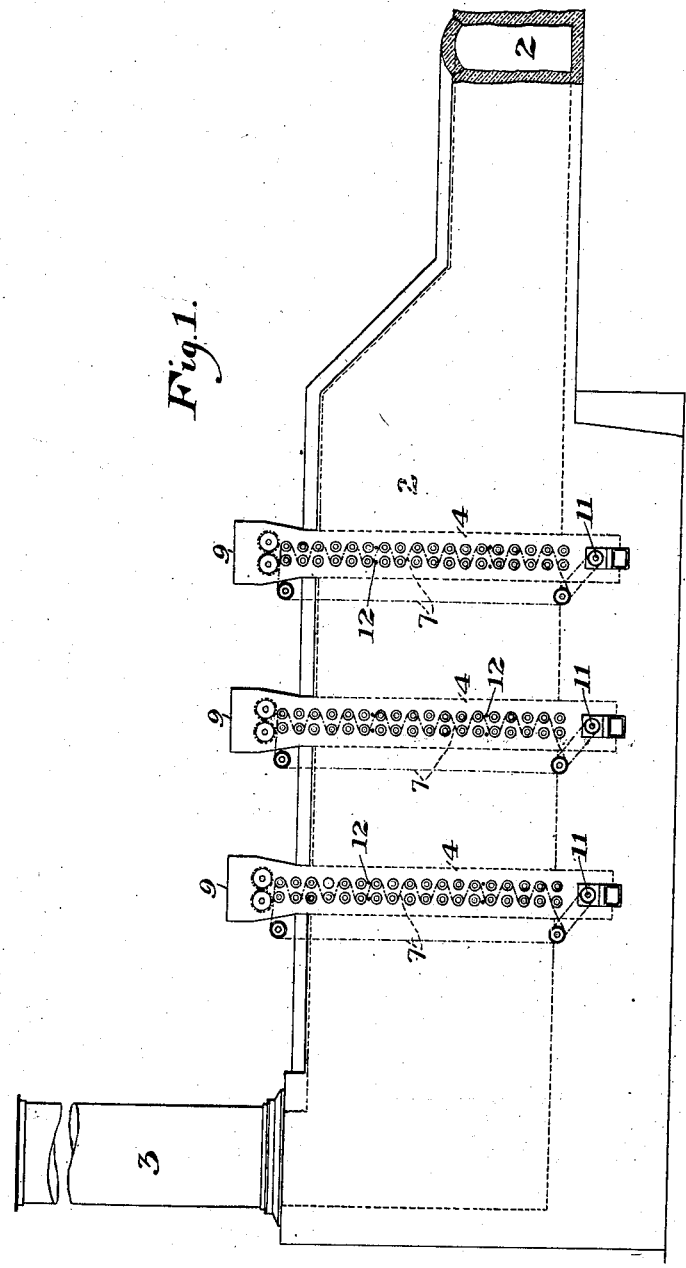
WITNESSES
INVENTOR

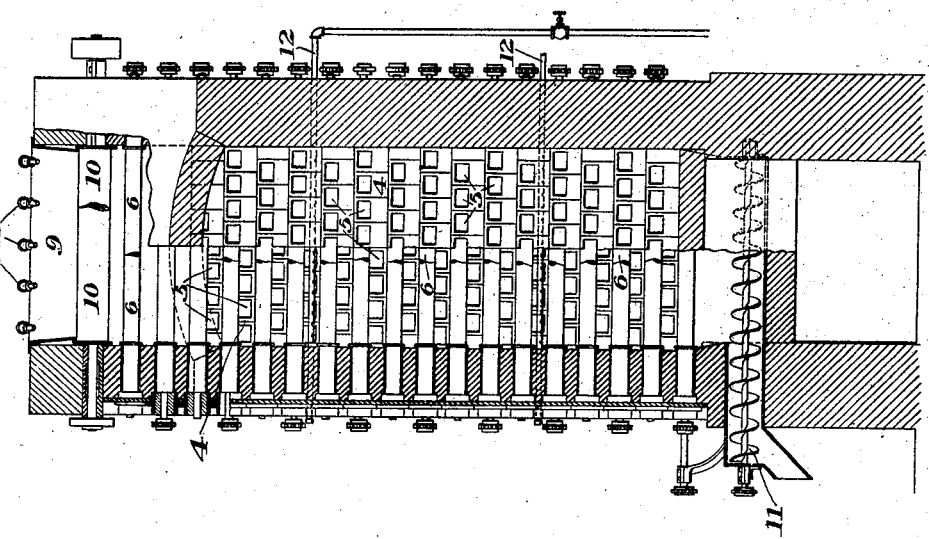
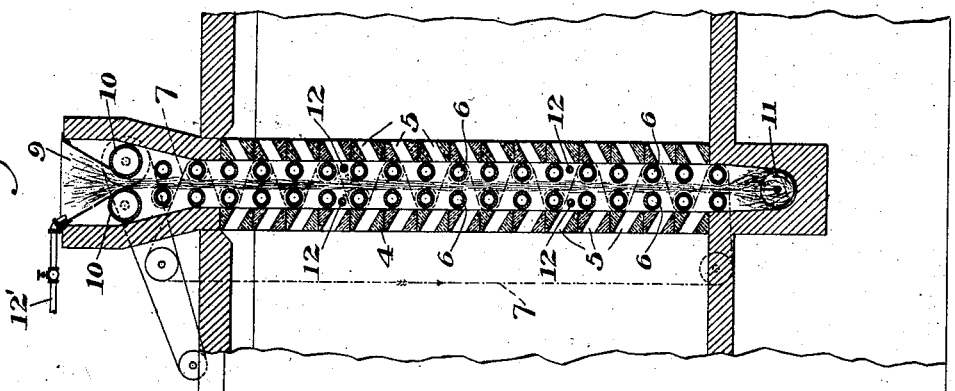
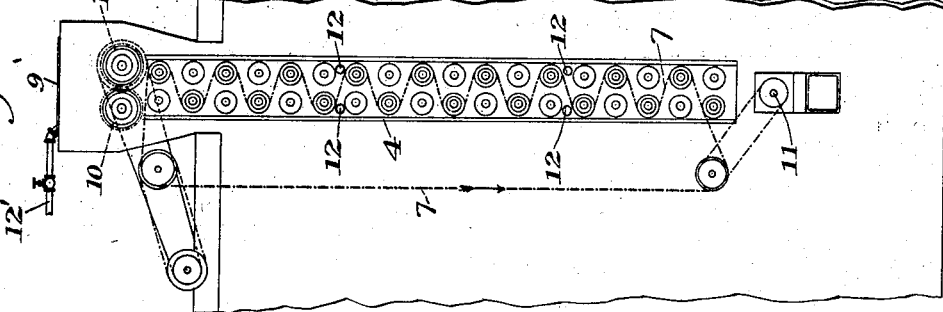

No. 746,236. PATENTED DEC. 8, 1903.
R. BAGGALEY.
APPARATUS FOR PRECIPITATING INJURIOUS FUMES FROM SMELTER GASES.
APPLICATION FILED FEB. 7, 1903.
NO MODEL.
3 SHEETS—SHEET 3.
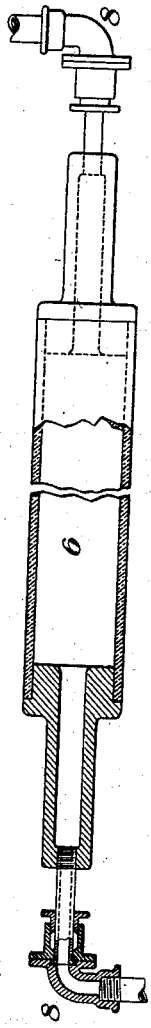
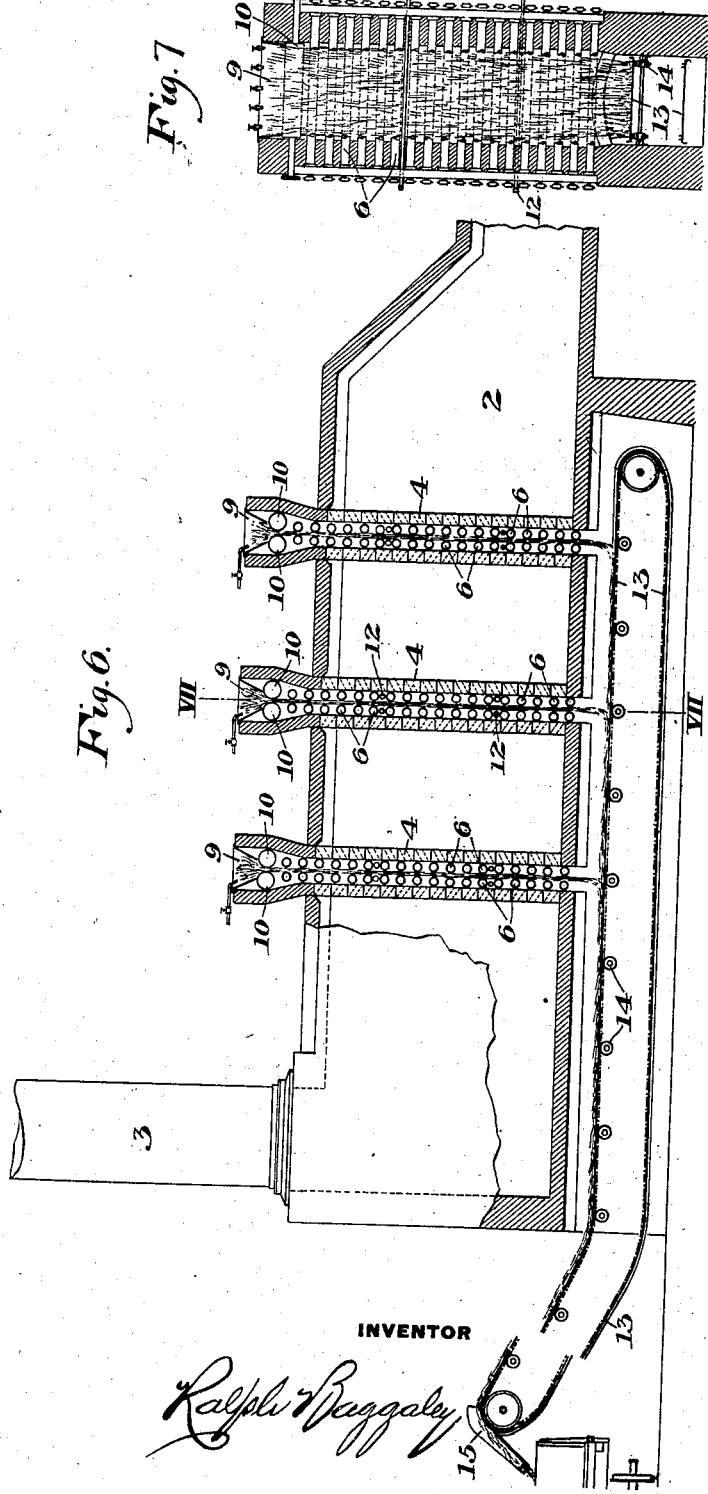
WITNESSES
INVENTOR
Ralph Baggaley No. 746,236. Patented December 8, 1903.

UNITED STATES PATENT OFFICE.

RALPH BAGGALEY, OF PITTSBURG, PENNSYLVANIA.

APPARATUS FOR PRECIPITATING INJURIOUS FUMES FROM SMELTER-GASES.

SPECIFICATION forming part of Letters Patent No. 746,236, dated December 8, 1903.

Application filed February 7, 1903. Serial No. 142,341. (No model.)

*To all whom it may concern:*

Be it known that I, RALPH BAGGALEY, of Pittsburg, Allegheny county, Pennsylvania, have invented a new and useful Apparatus for Precipitating Injurious Fumes from Smelter-Gases, of which the following is a full, clear, and exact description, reference being had to the accompanying drawings, forming part of this specification, in which—

Figure 1 is a side elevation of my apparatus. Fig. 2 is a plan view thereof. Fig. 3 is a side elevation of part of the apparatus on a larger scale. Fig. 4, which is shown as a continuation of Fig. 3, is a vertical longitudinal section on the line IV IV of Fig. 2. Fig. 5 is a vertical cross-section on the line V V of Fig. 2. Fig. 6 is a vertical longitudinal section illustrating a modification. Fig. 7 is a vertical cross-section on the lines VII VII of Fig. 6; and Fig. 8 is a sectional view, on a larger scale, showing one of the screen-rollers and the means for cooling it.

My invention relates to an apparatus whereby the obnoxious and injurious gases contained in the fumes from smelters may be precipitated with the greatest economy, utilizing as filters and precipitating-surfaces vegetable growth of the most abundant and cheapest form at the point where the smelting-plant may be located.

By interposing a filtering-surface that is constantly kept moist in the flue of a smelting-plant subject to the draft of the ordinary stack or an induced draft the free sulfur, sulfur dioxid, a portion of the arsenic, together with the antimony, lead, &c., will be precipitated on such surface or surfaces, and the fumes from the smelting process may thereafter be allowed to escape into the atmosphere without injury to vegetation and without polluting the waters of the district.

In order to arrest and precipitate all of the arsenic contained in the fumes, it will be necessary to use an alkaline solution on at least one of the filtering-screens, and it is preferably used on all of them, although a large proportion of the contained arsenic will be mechanically precipitated, together with the sulfur, iron, antimony, &c., by using on the screen pure water alone.

The substance utilized in practicing my invention will be regulated by conditions at various points. Thus when a smelter is located at or near the sea-coast—for instance, on Puget Sound, where vast quantities of kelp or seaweed are available—this material may be utilized to advantage, inasmuch as it is cheap, contains the requisite moisture within itself, and it is strongly alkaline. At inland points straw, hay, swamp-grasses, rushes, willows, the boughs of trees, and shrubs, particularly of the conifera family, as well as some varieties of the cactus, may be utilized. In the latter cases, however, it will be necessary to supply water or alkaline solution into the hoppers with the material.

In an ordinary smelting-furnace having a capacity of three hundred and fifty tons of ore in twenty-four hours it will be necessary to precipitate from the fumes in each twenty-four hours from fifty to seventy-five tons of impurities, according to the character of the ore under treatment. From one to three tons of straw or other material will be ample to provide the requisite condensing-surfaces, and the economy of this process will therefore be apparent to those skilled in the art.

It is also of the utmost importance as a measure of economy that handling of the material be avoided and that this be accomplished entirely, or nearly so, by machinery. This I effect by my apparatus, which I will now describe.

As shown in Figs. 1 to 5, 2 is a chamber through which the gases pass on their way from the smelter to the stack 3. In this chamber is a series of vertical columns 4, the sides of which are formed of perforated tiles or bricks, having passages 5, upwardly inclined from the interior to prevent the escape of the filtering material while permitting free travel to the gases. Each column contains a double vertical series of driven rollers 6, arranged to feed the filtering material downwardly through the column and to constitute racks or frames therefor. These rollers are driven by chains or belts 7, which may be connected to each alternate roller, as shown. The rollers are driven either continuously or intermittently and at any rate of speed that may be desired, the purpose being to rotate the rollers at a proper rate to present a fresh screen-surface to the gases as rapidly as the screen becomes clogged by precipitation of impurities. Iron is quickly attacked by the sulfur fumes, and I therefore employ rollers preferably made of seamless brass, and to prevent them from being heated and at the same time to reduce the temperature of the screen of filtering material I preferably make them hollow, as shown in Fig. 8, and provide them at the ends with swiveled water connections 8, so that constant streams of water may be maintained through them. At the upper end of each column is a feed-hopper 9, with feed-rollers 10, and at the lower end is a conveyer 11, which may be a screw conveyer, Fig. 5. At an intermediate point or points of the column are water-supply pipes 12, by which the screen of filtering material may be wet with water or alkaline solution. Pipes 12' are preferably arranged to discharge water or alkaline solution upon the material in the feed-hoppers.

In the use of my apparatus the vegetable material above described is charged into the hopper 9 and being engaged by the feed-rollers 10 is fed downward in the column between the rollers 6 in the form of a mat or screen, which is wetted with water or alkaline solution from the pipes 12, and by these rollers is caused to travel downward at the rate desired to the screw conveyer 11, by which the waste material is discharged upon a belt or into a car or other convenient receptacle. The fumes from the smelter pass through the chamber 2 and through the vegetable screens to the stack 3, and the sulfur, iron, arsenic, and other impurities contained in the fumes will be precipitated on the screens and will be carried downward thereby. The rollers crush in a measure the precipitated impurities.

Within the scope of my invention, as broadly claimed, the screens shown in the drawings may be substituted by mats of straw or vegetable fiber woven or matted together before introduction into the path of the gases; but I prefer the construction shown, as it is cheap and very efficient.

It will be seen that the only manual labor required by the apparatus is the arrangement of the vegetable material in the hoppers 9.

In Figs. 6 and 7 I show my apparatus modified by the use of a belt conveyer 13, which extends beneath the chamber 2 for the removal of the waste material delivered from the columns. This belt conveyer passes over suitable supporting-rollers 14 and leads to a spout 15. The form of conveyer shown in Figs. 1 to 5 is suitable when seaweed and kelp are employed; but the belt conveyer of Figs. 6 and 7 is best adapted to use when straw and the other vegetable materials above mentioned are used to constitute the screens.

Within the scope of my invention as defined in the claims the apparatus may be modified, since what I claim is—

1. Apparatus for removing impurities from smelter-gases comprising a screen interposed in the path of the gases, and means for causing the screen to travel across the path of the gases; substantially as described.

2. Apparatus for removing impurities from smelter-gases comprising a screen of vegetable matter interposed in the path of the gases, and means for causing the screen to travel across the path of the gases; substantially as described.

3. Apparatus for removing impurities from smelter-gases comprising a screen interposed in the path of the gases, means for causing the screen to travel across the path of the gases, and a liquid-supply adapted to wet the screen; substantially as described.

4. Apparatus for removing impurities from smelter-gases, comprising a screen of vegetable matter interposed in the path of the gases, and a series of rollers by which the screen is carried; substantially as described.

5. Apparatus for removing impurities from smelter-gases, comprising a screen of vegetable matter interposed in the path of the gases, a series of rollers by which the screen is carried, and a feed-hopper for supplying the vegetable material of which the screen is composed; substantially as described.

6. Apparatus for removing impurities from smelter-gases, comprising a screen of vegetable matter interposed in the path of the gases, a series of rollers by which the screen is carried, a hopper for feeding the material of which the screen is composed, and a conveyer at the end of the series of rollers for removing the material of the screen; substantially as described.

7. Apparatus for removing impurities from smelter-gases, comprising a screen of vegetable matter interposed in the path of the gases, moving mechanism by which the screen is carried, a hopper for feeding the material of which the screen is composed, and a conveyer at the end of the series of rollers for removing the material of the screen; substantially as described.

8. Apparatus for removing impurities from smelter-gases, comprising a screen of vegetable matter interposed in the path of the gases, a series of rollers by which the screen is carried, and a perforated column within which the rollers are set; substantially as described.

9. Apparatus for removing impurities from smelter-gases, comprising a screen of vegetable matter interposed in the path of the gases, a series of rollers by which the screen is carried, and a perforated column within which the rollers are set, the perforations in the column being upwardly inclined; substantially as described.

10. Apparatus for removing impurities from smelter-gases, comprising a screen of vegetable matter interposed in the path of the gases, and a series of rollers by which the screen is carried, said rollers being hollow and water-cooled; substantially as described.

11. Apparatus for removing impurities from smelter-gases, comprising a succession of screens of vegetable matter interposed in the path of the gases, each screen having a moving mechanism by which it is caused to travel across the path of the gases; substantially as described.

12. Apparatus for removing impurities from smelter-gases, comprising a succession of screens of vegetable matter interposed in the path of the gases, each screen having a moving mechanism by which it is moved, and a feed-hopper to supply the material for the screen; substantially as described.

In testimony whereof I have hereunto set my hand.

RALPH BAGGALEY.

Witnesses:
GEO. B. BLEMING,
H. M. CORWIN.